(12) United States Patent
Schriever et al.

(10) Patent No.: US 7,062,713 B2
(45) Date of Patent: Jun. 13, 2006

(54) DISPLAYING CONTROL POINTS OVER A TIMELINE

(75) Inventors: Michiel Schriever, Montreal (CA); William James Roberts, Montreal (CA)

(73) Assignee: Autodesk Canada Co., Montreal (CA)

( * ) Notice: Subject to any disclaimer, the term of this patent is extended or adjusted under 35 U.S.C. 154(b) by 723 days.

(21) Appl. No.: 10/118,835

(22) Filed: Apr. 9, 2002

(65) Prior Publication Data

US 2002/0156805 A1    Oct. 24, 2002

(30) Foreign Application Priority Data

Apr. 20, 2001 (GB) ................................. 0109740.1

(51) Int. Cl.
*G11B 27/00* (2006.01)
(52) U.S. Cl. .................. 715/723; 715/716; 386/52
(58) Field of Classification Search ................ 345/972, 345/716, 726, 719, 823, 730, 974, 475; 715/716, 715/972, 722, 723, 726; 386/52
See application file for complete search history.

(56) References Cited

U.S. PATENT DOCUMENTS

| 5,237,648 | A | 8/1993 | Mills et al. |
| 5,384,667 | A * | 1/1995 | Beckwith ................ 386/55 |
| 5,388,197 | A * | 2/1995 | Rayner ................ 715/723 |
| 5,760,767 | A | 6/1998 | Shore et al. |
| 5,781,188 | A | 7/1998 | Amiot et al. |
| 5,786,814 | A | 7/1998 | Moran et al. |
| 5,818,542 | A | 10/1998 | Harnois |
| 5,892,506 | A | 4/1999 | Hermanson |
| 5,999,173 | A * | 12/1999 | Ubillos ................ 715/724 |
| 6,084,588 | A | 7/2000 | De Haan |
| 6,269,180 | B1 | 7/2001 | Sevigny |
| 6,404,975 | B1 | 6/2002 | Bopardikar et al. |
| 6,674,955 | B1 * | 1/2004 | Matsui et al. ............. 386/52 |
| 2001/0036356 | A1 * | 11/2001 | Weaver et al. ............. 386/52 |
| 2002/0154156 | A1 * | 10/2002 | Moriwake et al. .......... 345/716 |

FOREIGN PATENT DOCUMENTS

| EP | 0526064 A2 | 2/1993 |
| WO | WO 96/19779 | 6/1996 |
| WO | WO 98/11512 | 3/1998 |

* cited by examiner

*Primary Examiner*—Kieu D. Vu
*Assistant Examiner*—Ting Zhou
(74) *Attorney, Agent, or Firm*—Gates & Cooper LLP (57) ABSTRACT

On a display monitor (102) the first region is displayed representing a first timeline (601) showing transitions between a first set of image clips. A second region is displayed representing a second timeline (602) showing transitions between a second set of image clips. Control points (621,622) are displayed over said first timeline (601) and over second timeline (602). The location of the control points controls an effect upon a first clip (601) and upon a second clip (602).

24 Claims, 10 Drawing Sheets

DISPLAYING CONTROL POINTS OVER A TIMELINE

CROSS-REFERENCE TO RELATED APPLICATIONS

This application claims priority under 35 USC § 119 to the following co-pending and commonly-assigned patent application which is incorporated by reference herein:

United Kingdom Patent Application Number 01 09 740.1, entitled "IMAGE DATA PROCESSING", filed on Apr. 20, 2001.

This application is related to the following co-pending and commonly-assigned patent(s) and/or patent application (s), which are incorporated by reference herein:

U.S. Pat. No. 5,818,542, entitled "PROCESSING IMAGE DATA", by Stephane Robert Harnois, Attorney Docket No. 30566.152US01, issued on Oct. 6, 1998 (Application Ser. No. 632,341, filed on Apr. 10, 1996);

U.S. Pat. No. 6,269,180, entitled "METHOD AND APPARATUS FOR COMPOSITING IMAGES", by Benoit Sevigny, Attorney Docket No. 30566.180US01, issued on Jul. 31, 2001 (application Ser. No. 08/827,641 filed on Apr. 9, 1997), which is based on British Patent No. 2312124 filed on Apr. 12, 1996;

U.S. Pat. No. 6,084,588, entitled "INTERACTION BETWEEN MOVING OBJECTS AND MATTE DERIVED FROM IMAGE FRAMES", by Gisbert De Haan, Attorney Docket No. 30566.172US01, issued on Jul. 4, 2000 (application Ser. No. 08/824,691 filed on Apr. 8, 1997), which is based on British Patent No. 9607649 filed on Apr. 12, 1996;

U.S. Pat. No. 5,892,506, entitled "MULTITRACK ARCHITECTURE FOR COMPUTER-BASED EDITING OF MULTIMEDIA SEQUENCES", by David Hermanson, Attorney Docket No. 30566.151US01, issued on Apr. 6, 1999 (application Ser. No. 08/617,400 filed on Mar. 18, 1996); and U.S. patent application Ser. No. 08/843,282, entitled "VIDEO STORAGE", by Raju C. Bopardikar, et. al., Attorney Docket No. 30566.178USU1, filed on Apr. 14, 1997, which application is based on U.S. provisional patent application No. 60/015,468 filed on Apr. 15, 1996.

BACKGROUND OF THE INVENTION

1. Field of the Invention

The present invention relates to Image Data Processing Apparatus, comprising frame storage means, processing means, manually operable input means and display means.

2. Description of the Related Art

Computerised systems for performing effects upon clips of image frames are known. For example, a dissolve effect is described in U.S. Pat. No 5,818,542 assigned to the present assignee. An effect for the matching of film-like grain upon video material is described in British Patent No 2312124 (U.S. Ser. No. 08/827,641) assigned to the present assignee. An effect for allowing three dimensional particles to interact with two dimensional video material is described in U.S. Pat. No. 6,084,588 assigned to the present assignee. Many other effects are also implemented in software licenced by the present assignee under the trademark "FLAME".

In known systems, effects processing is generally performed as a stand alone activity. Often an operator will be working with relatively short clips of video or film-sourced material which is then transferred to an editing station on data carrying medium or via a network. Alternatively, the same physical station may load new program instructions for an editing operation to be performed. This could include, for example, editing software licensed by the present assignee under the trademark "FIRE".

In an editing environment, such as Fire, source material is combined with material that has had effects performed upon it so as to produce output sequences forming the final production. To facilitate editing activities it is known to display timelines to an editor, such as described in U.S. Pat. No. 5,892,506 assigned to the present assignee.

A culture has been generated in which effects processing and editing are perceived as completely separate activities. Problems therefore arise in that if an editor wishes to modify an effect it is necessary for the material to be processed again within an effects environment and then exported back to the editing environment. Alternatively, editors could be presented with effects functionality, but a problem occurs in that interfaces for known effects processing differs substantially from known interfaces, including timelines or editing.

BRIEF SUMMARY OF THE INVENTION

According to an aspect of the present invention, there is provided Image data processing apparatus, comprising frame storage means, processing means, manually operable input means and display means, wherein said display means is configured to display: (a) a first region representing a first timeline showing transitions between a first set of clips; (b) a second region representing a second timeline showing transitions between a second set of clips; and (c) a first control point overlaying said first time line and a second control point overlaying said second timeline, wherein an effect applied to a clip from said first set of clips and a clip from said second set of clips is controlled by the location of said first control point and said second control point.

BEST MODE FOR CARRYING OUT THE INVENTION

FIG. 1

Figure 1:
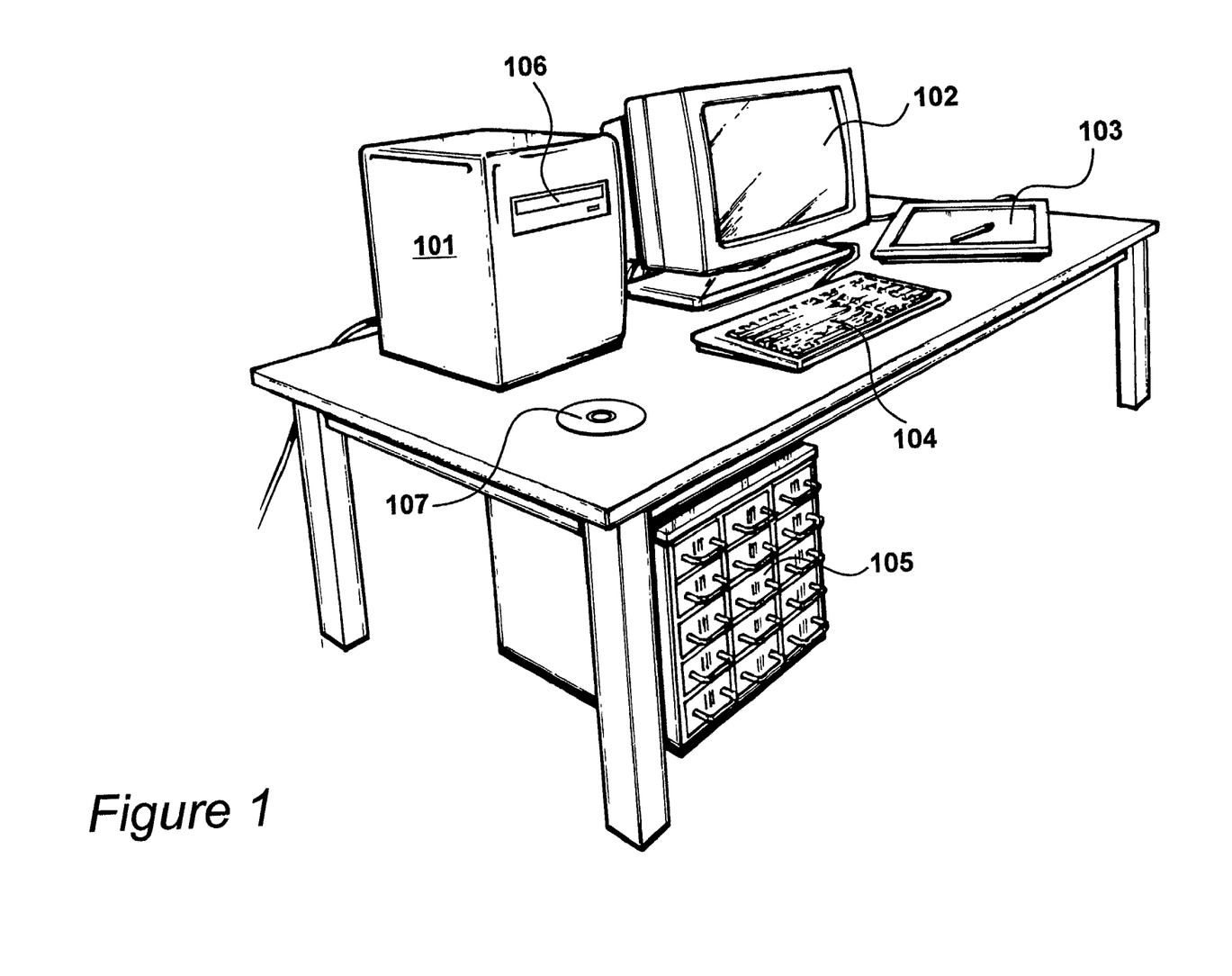
FIG. 1 shows a system for editing image data.

A system for editing image data and for controlling effects processing is illustrated in FIG. 1. The system includes a computer 101 configured to display video output via a monitor 102. The computer runs applications software that facilitates the editing and processing operations and monitor 102 provides a graphical user interface to a user, allowing film or video clips to be previewed and facilitating the control of editing and effects manipulation.

The graphical user interface provides a user with several controls and interfaces for controlling the manipulation of image data. The system also includes a graphics tablet 103, to allow the user to interact with a graphical user interface and a keyboard 104 to facilitate alpha numeric input.

The system further comprises a disk based frame storage system 105, referred to herein as a Framestore. In preparation for image editing and manipulation, images from one or more film or video input reels are transferred to the framestore 105 via a digital tape player or film scanning apparatus etc.

The framestore 105 may be of the type supplied by the present assignee under the trademark "STONE" and includes several high capacity hard disk drives arranged to supply and store image data in parallel across many individual drives at once. The drives are configured as a redundant array of inexpensive discs (RAID). Further details of the RAID system are disclosed in British Patent No 2312319 (U.S. Ser. No. 08/843,282) assigned to the present assignee.

From the framestore 105 it is possible to play back and record high resolution film images or video images at any location in a clip without having to wait for a tape mechanism to rewind to reach a required frame position, thereby facilitating the process of non linear editing.

In a typical application, film clips are digitised and stored on digital tape for transfer to the framestore 105. Film clips include several camera shots that are to be combined in to the same scene. In addition, effects are to be performed and in particular dissolve effects are to be performed where the ordering or priority of layering is modified over the duration of an output sequence.

Computer 101 is a silicon graphics octane and includes a CD ROM drive 106. Application software, providing a graphical user interface and image editing functionality is installed from a CD ROM 107. It should be appreciated that many other computing environments could be used.

FIG. 2

Figure 2:
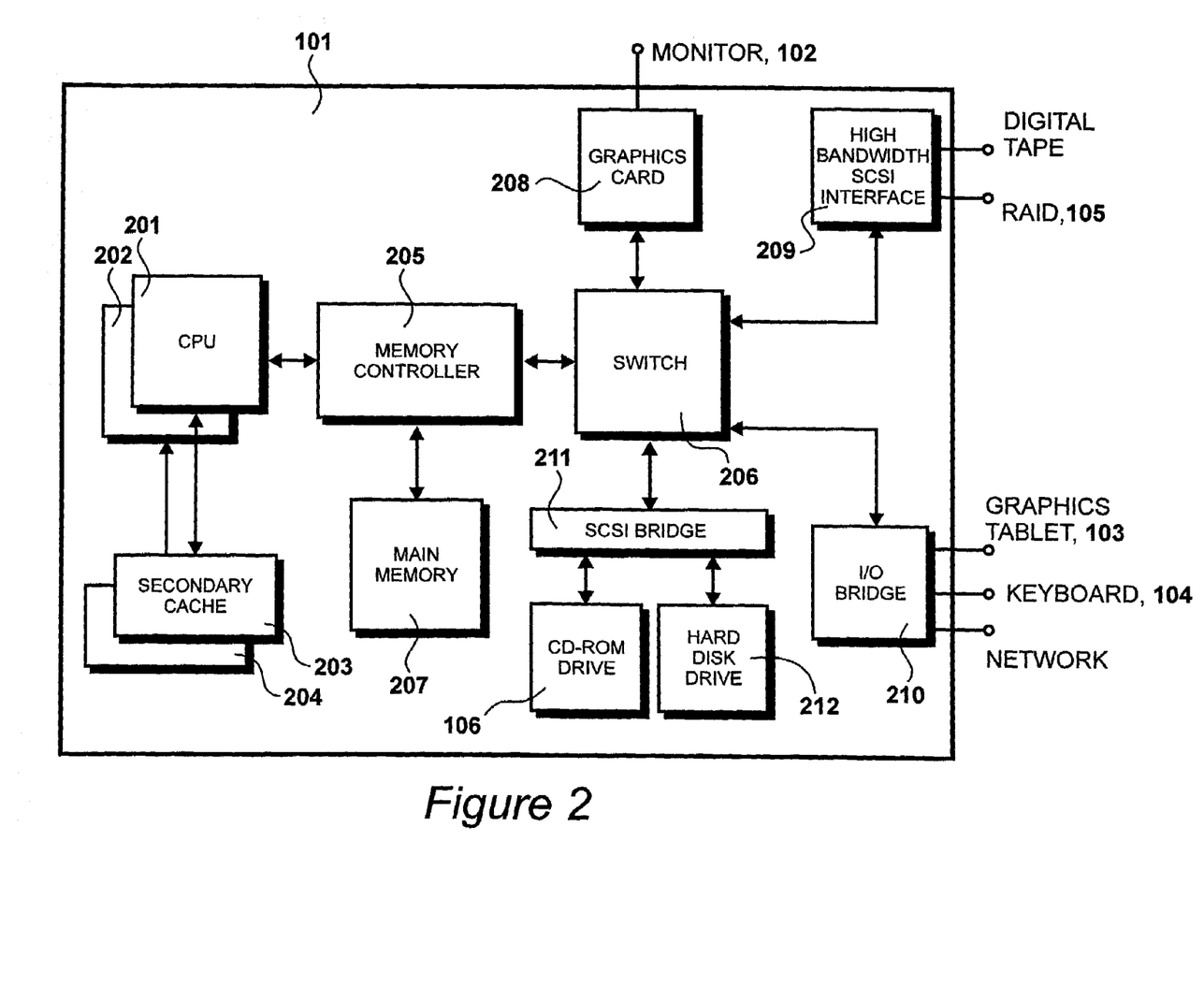
FIG. 2 illustrates the computer system shown in FIG. 1.

Computer system 101 is illustrated in FIG. 2 and includes two MIPS R12000 Central Processing Units (CPU's) 201 and 202, configured to process instructions and data in parallel. Primary cache facilities are provided within each of processors 201 and 202 and in addition each of processors 201 and 202 are equipped with one megabyte of secondary cache 203 and 204. The CPU's 201 and 202 are connected via a memory controller 205 to a switch 206 and a main memory 207, consisting of two gigabytes of dynamic RAM.

Switch 206 enables up to seven different non blocking connections to be made between connected circuits. A graphics card 208 receives instructions from CPU 201 or from CPU 202 or from both 201 and 202 in order to render image data and graphical user interface components on display monitor 102. A high bandwidth SCSI bridge 209 allows high bandwidth communication to be made with the digital tape player and the frame store 105. An input/output bridge 210 provides input/output interface circuitry for peripherals, including the graphics tablet 103, the keyboard 104 and a network. A second SCSI bridge 211 provides interface connections with an internal hard disk drive 212 providing a capacity of thirteen gigabytes. A second SCSI bridge 211 also provides connections to CD ROM drive 106, to facilitate the installation of instructions from a CD ROM on to hard disc 212.

FIG. 3

Figure 3:
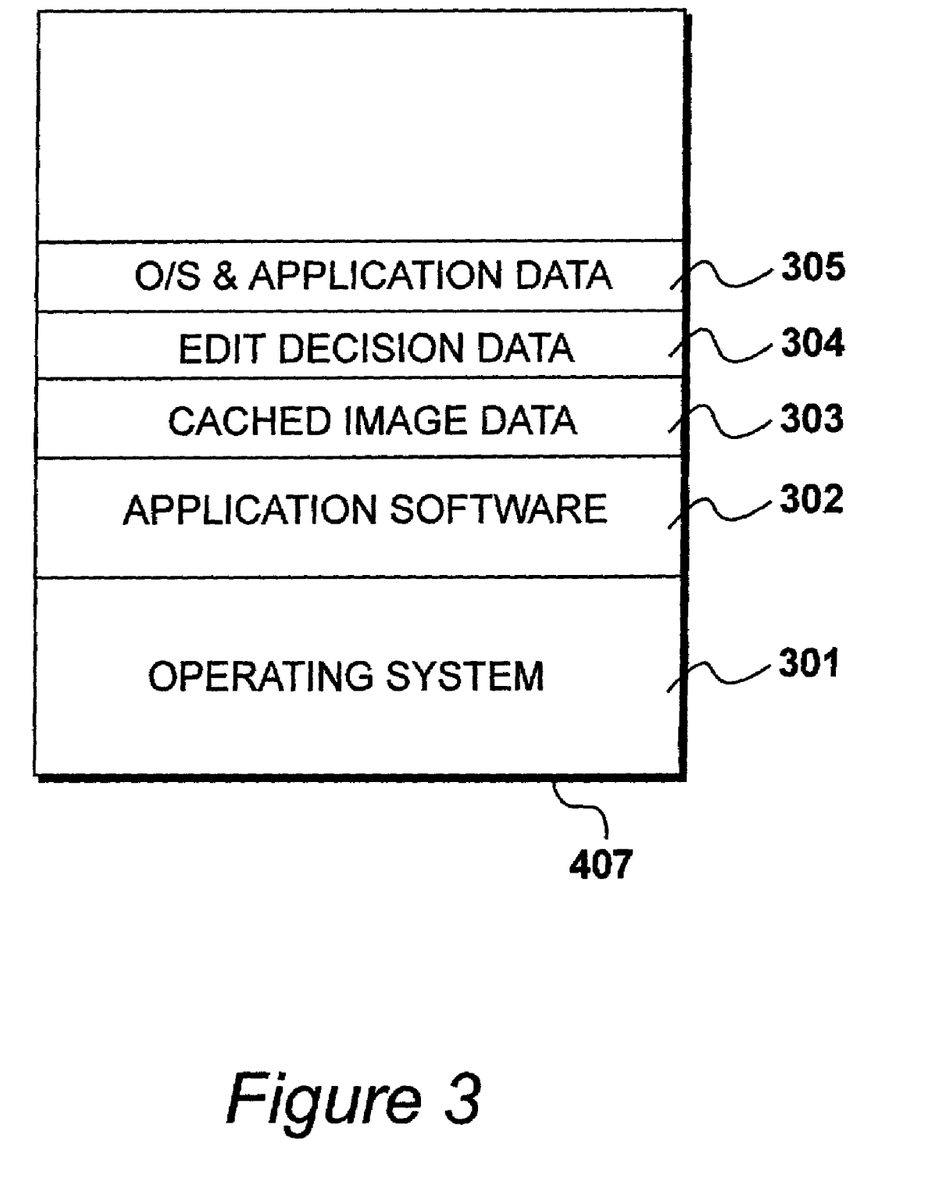
FIG. 3 shows the contents of main memory identified in FIG. 2.

Main memory 207 and its data content are illustrated in FIG. 3. The main memory 207 provides storage for an operating system 301, such as Irix on the Octane or Windows XP on an Intel based system, along with an application program 302, providing the graphical user interface and facilitating editing operations. In addition, the main memory 207 also provides storage for various data structures including cached image data 203, edit decision data 304 and other related data 305. The editing process results in the creation of metadata defining how an output sequence is to be made up from stored clips without actually moving the clip data itself.

FIG. 4

Figure 4:
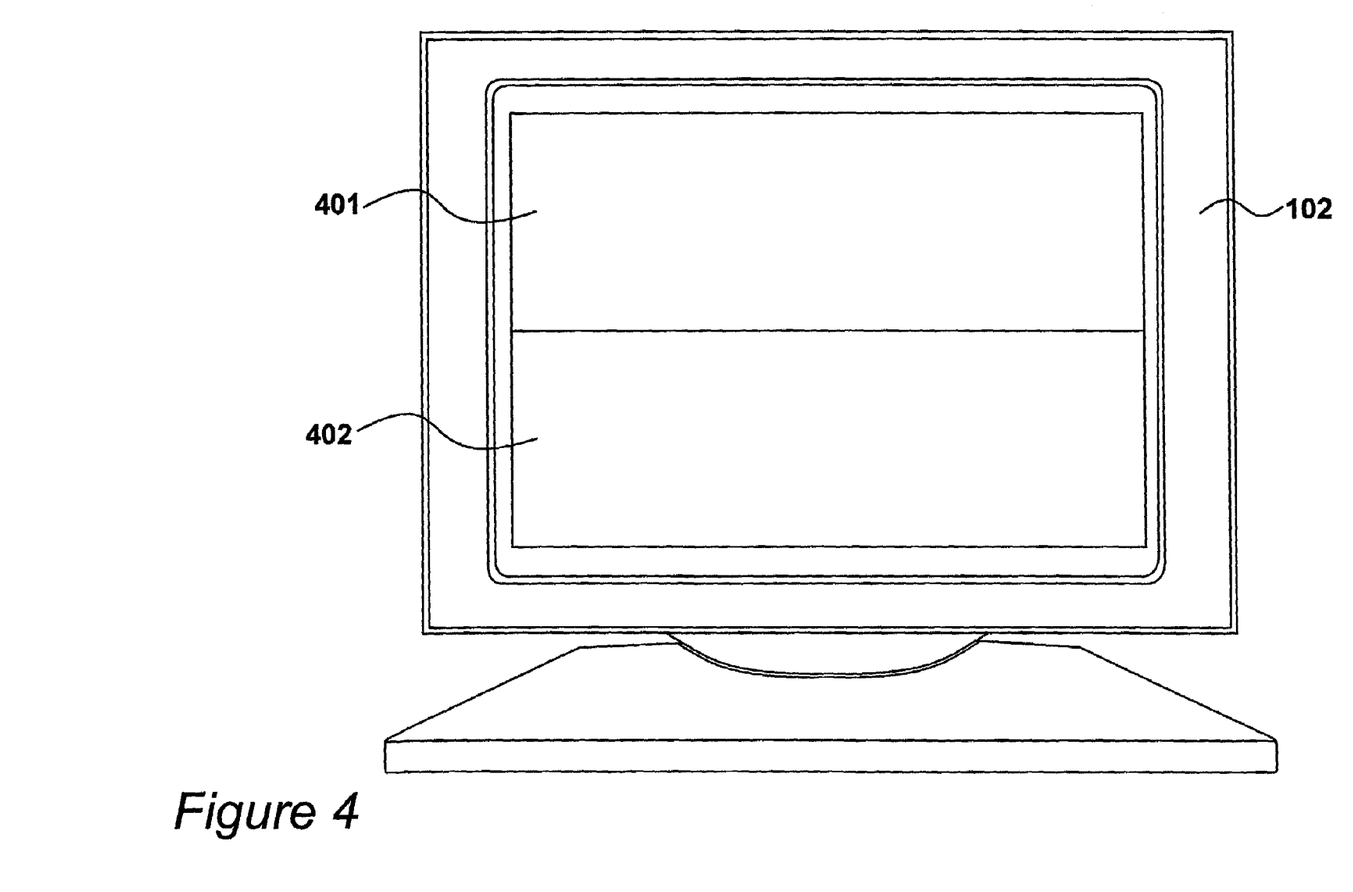
FIG. 4 details the monitor shown in FIG. 1.

Monitor 102 is shown in FIG. 4. In alternative configurations, two monitors may be connected to a computer in which predominately editing operations are displayed on the first monitor and predominately effects operations are displayed on a second monitor. Monitor 102 shown in FIG. 4 may provide the editing monitor type of the two monitor configuration.

A graphical user interface is divided in to a first upper tile 401 and a second lower tile 402. The tiles are scalable but are not floating and therefore remain substantially in position thereby ensuring that particular user operable interface commands remain substantially in the same place.

Upper tile 401 is used to display data relating to media management and lower tile 402 is used to display timelines and related information. The interface provided within tile 401 allows media to be selected, moved and identified as belonging to a particular project by the creation of metadata representing clip libraries etc.

Timelines shown within tile 402 allow edits to be defined. In particular, data is loaded from input reels to define source clips of material. These source clips are established within input timelines with priorities so as to define the actual image frames that would be included within an output sequence. As a default the timelines are shown within tile 402. However, it is possible to display a timeline in tile 401 as well, when required.

FIG. 5

Figure 5:
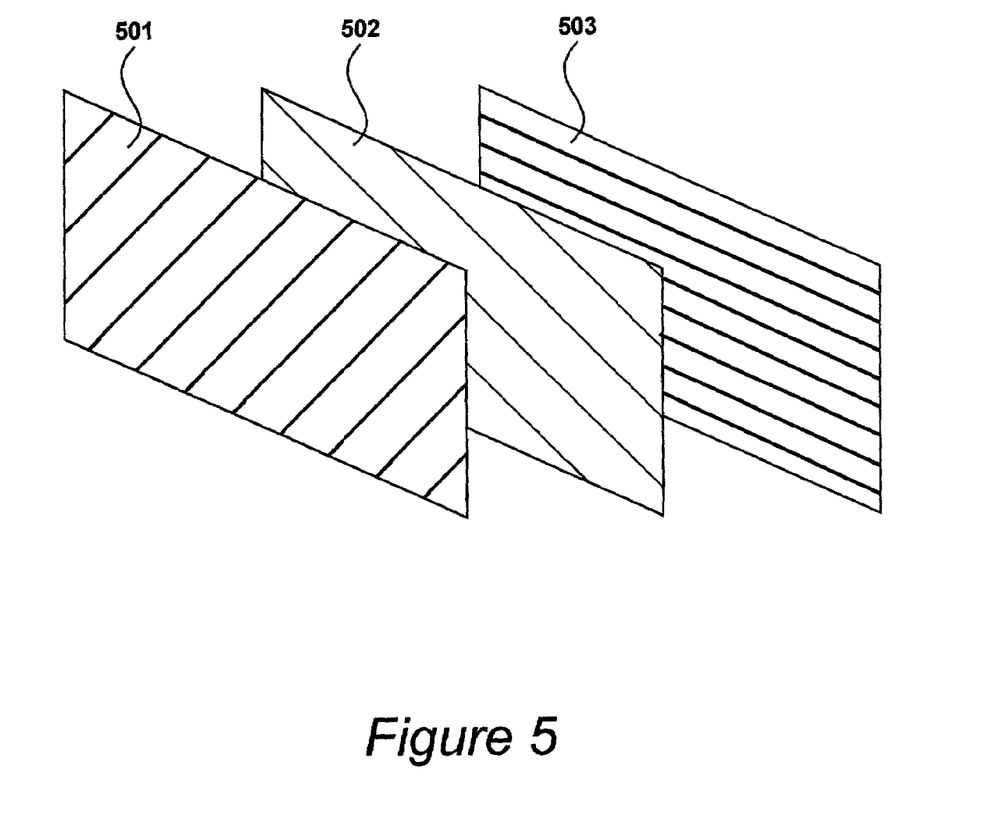
FIG. 5 illustrates video layers.

Input clips may be arranged such that several clips are displayable in parallel. An output is derived exclusively from one of a plurality of clips or, alternatively, image data from two or more clips is combined so as to generate an effect. Conceptually, this is akin to the clips being arranged in layers, as illustrated in FIG. 5. Image frame 501 represents a first layer, that, under normal circumstances, would have priority over underlying layers. Thus, unless instructed otherwise, layer 501 is displayed in preference to layer 502 and layer 502 is displayed in preference to layer 503. An editing operation may change the priority of these layers such that, for example, a cut may be generated so as to switch from sources derived from layer 501 to sources derived from layer 502. Similarly, this transition may take place over a period of time such that a period exists in which image data is being derived from both layer 501 and from layer 502. An effect that relies upon data input of this type is a dissolve. Over time, the priorities are gradually exchanged such that, on a frame by frame basis, less of the image is derived from source 501 and more of the image is derived from source 502.

FIG. 6

Figure 6:
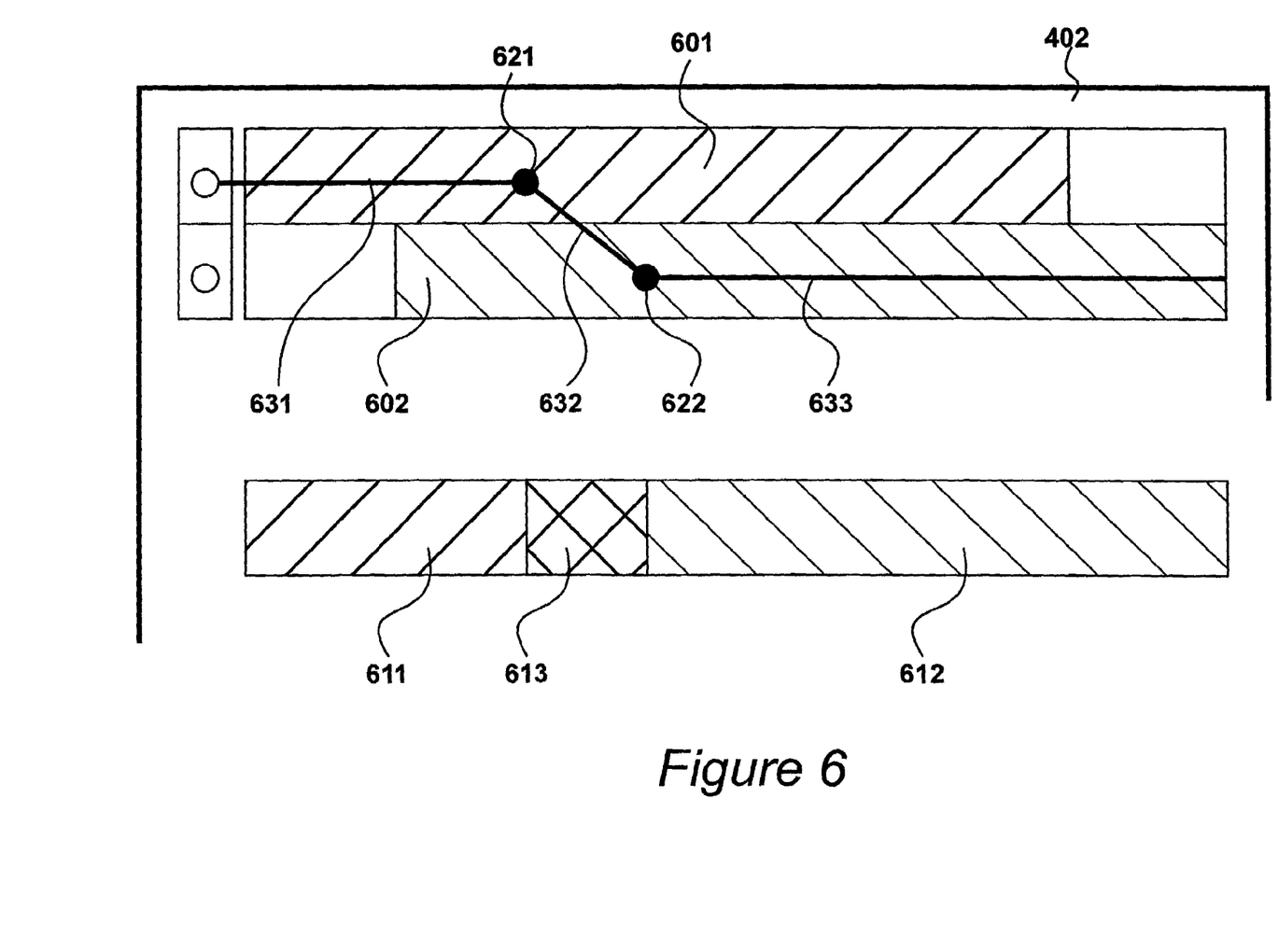
FIG. 6 illustrates a first transition type.

A transition of this type is illustrated in FIG. 6. A first input clip is shown at 601 that has been loaded in combination with a second input clip shown at 602. A desired output sequence is shown below, consisting of a first section 611 derived from clip 601 and a second section 612 derived from clip 602. Between section 611 and 612 there is a dissolve 613 in which image data is derived decreasingly from clip 601 and increasingly from clip 602.

In a conventional editing environment, it would be possible for the dissolve 613 to be generated within an effects engine and then brought back in to the editing environment. However, if the editor then wishes to change the nature of the dissolve, the dissolve effect would need to be created again. Such a situation exists for any effect that requires source material to be derived from both clip 601 and clip 602.

The present embodiment provides for a first control point 621 to overlay a first timeline 601, wherein said first timeline 601 represents images derived from a first input clip. A second control point 622 overlays a second timeline 602, representing a second input clip. An effect is applied to the first clip in combination with the effect being applied to the second clip. The nature of the effect is controlled by the location of the first control point 621 with the second control point 622 for example, the position of the control points may control the duration and nature of a dissolve.

Control point 621 and 622 are defined by user deploying the graphics tablet 103. As an alternative to using the graphics tablet, another user input device, such as a mouse, which provides cursor positioning and "clicking", may be used. The system is then configured to connect control point 621 and 622 with control lines 631, 632 and 633. Control line 631, 632 and 633 define the priorities of the clips. Thus, as the control line at location 631 descends over portion 632 in to the region of 633 where it is present within a second timeline in preference to being in the position of the first timeline, this indicates that priority has been handed over from the upper clip 601 to the lower clip 602. The period of transition is then defined by control line 632 in order to achieve transition 613.

Data from the control line is then used directly to control a dissolve effect and it is not necessary for the data to be transferred to an effects system. In this way, an editor is able to control an effect process, not usually associated with editing operations, within a timeline environment familiar to editors.

FIG. 7

Figure 7:
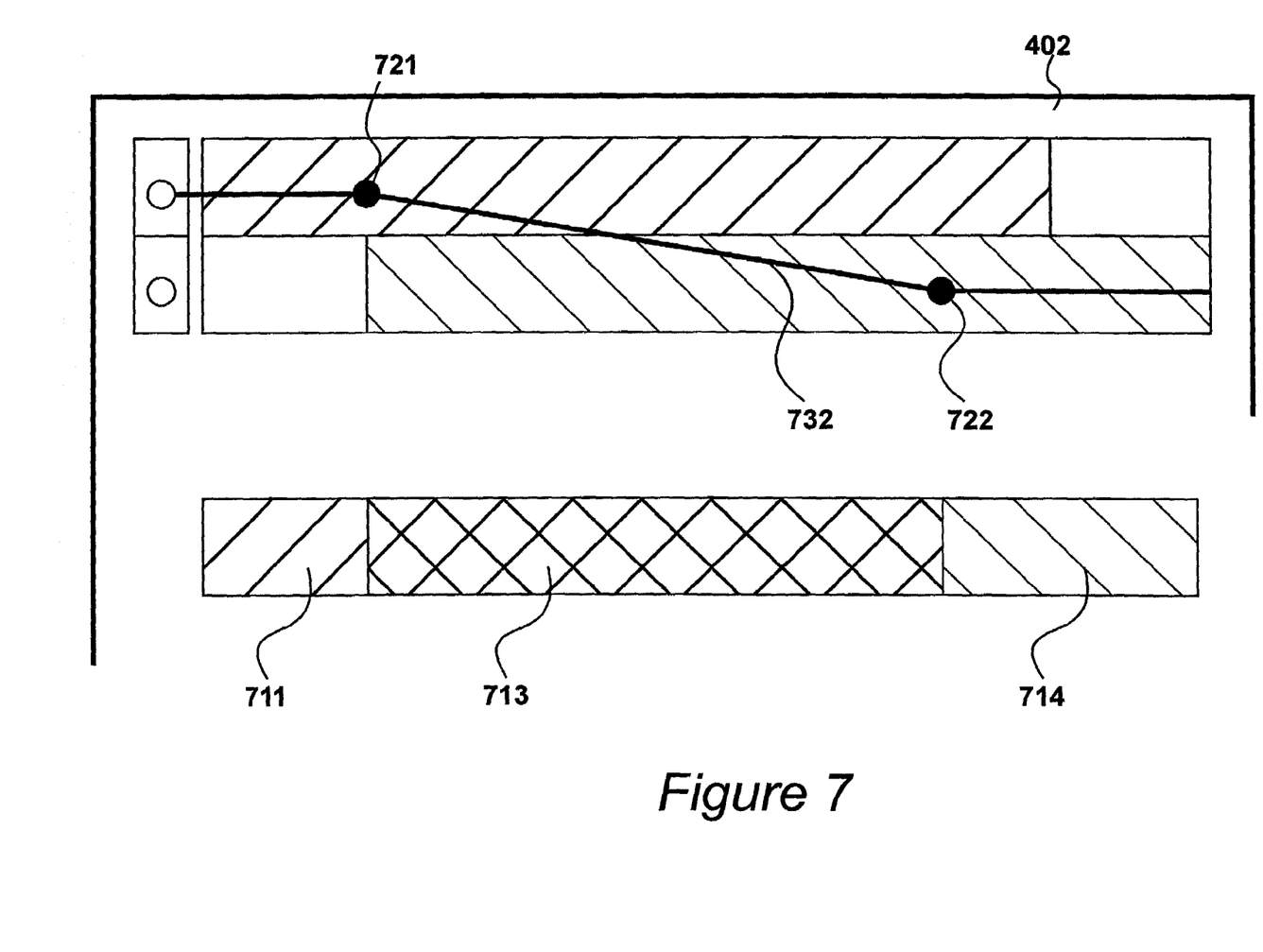
FIG. 7 illustrates modifications to the defined type of FIG. 6.

As illustrated in FIG. 7 it is now relatively easy for the editor to modify the nature of the effect without recourse to alternative processing environments. In the example shown, an editor has translated control point 622 along the length of the second timeline to a position 722. The location of the other control point identified as 621 has remained substantially the same but the duration of the effect, identified by control line 732 has significantly increased in length.

The resulting output sequence is shown below, consisting of a first portion 711, a second portion 713 and a third portion 714. Portion 713, where the dissolve effect takes place, is substantially similar to portion 613, but its duration has been significantly increased. Thus, a fundamental parameter of the dissolve effect has been modified using a relatively modest operation performed by the editor.

FIG. 8

Figure 8:
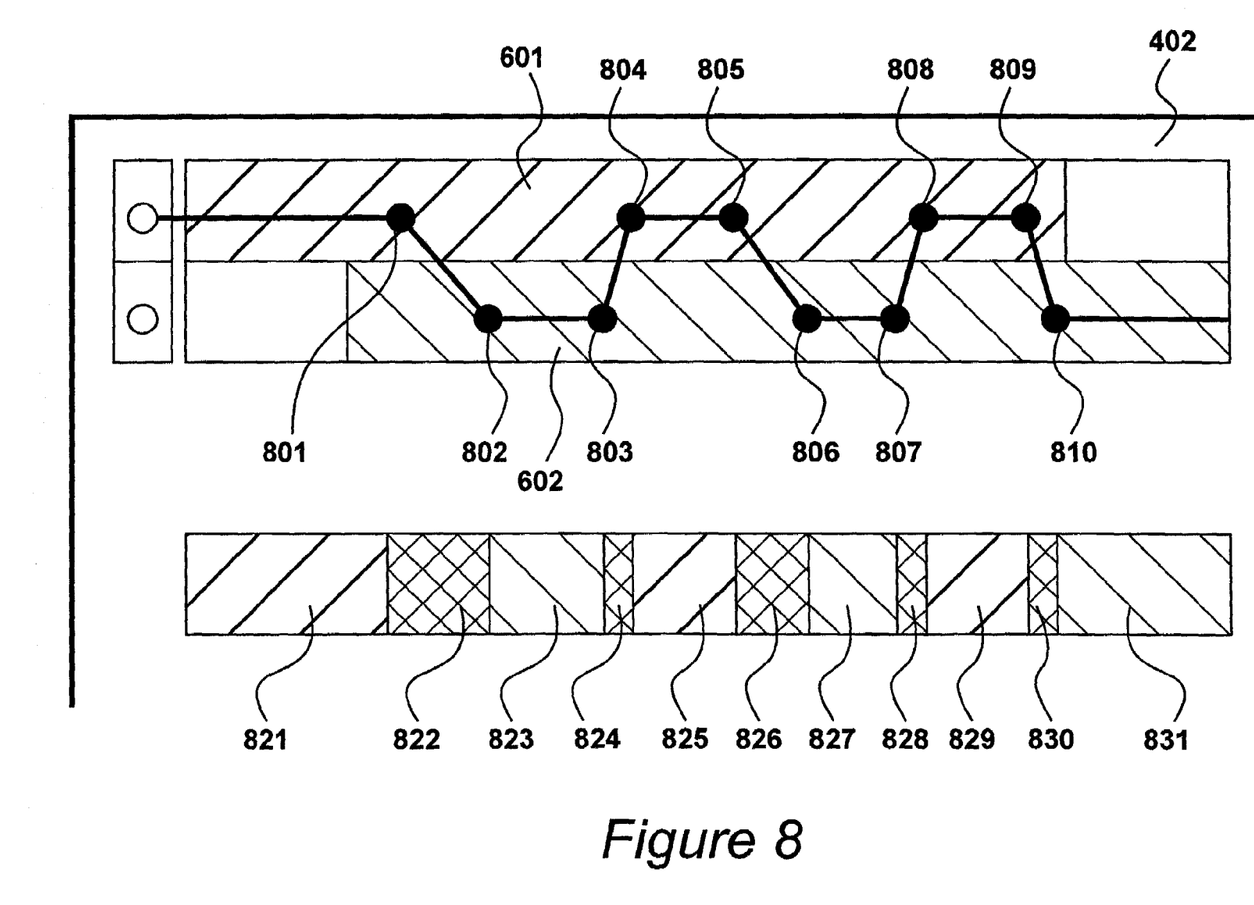
FIG. 8 illustrates further modifications to the type shown in FIG. 6.

Further modifications of this type are illustrated in FIG. 8 whereupon a relatively sophisticated dissolve effect has been introduced, that, in conventional environments would require considerable work.

The editor has now introduced a total of ten control points 801 to 810. The input clips remain the same but these control points now control a total of five dissolves. The resulting output sequence consists of a first section 821 derived exclusively from input clip 601. This is followed by a dissolve 822 followed by a portion 823 derived exclusively from clip 602. This is followed by dissolve 824, followed by section 825 derived exclusively from clip 601. This is followed by dissolve 826 and then followed by a portion 827 derived from clip 602. This is followed by dissolve 828 and a section 829 derived from clip 601. Then finally a dissolve 830 is followed by a section 831 derived exclusively from clip 602. Thus, using this technique it is possible from a relatively straightforward dissolve effect to provide a degree of animation that is easily controlled within the editing procedures.

FIG. 9

Figure 9:
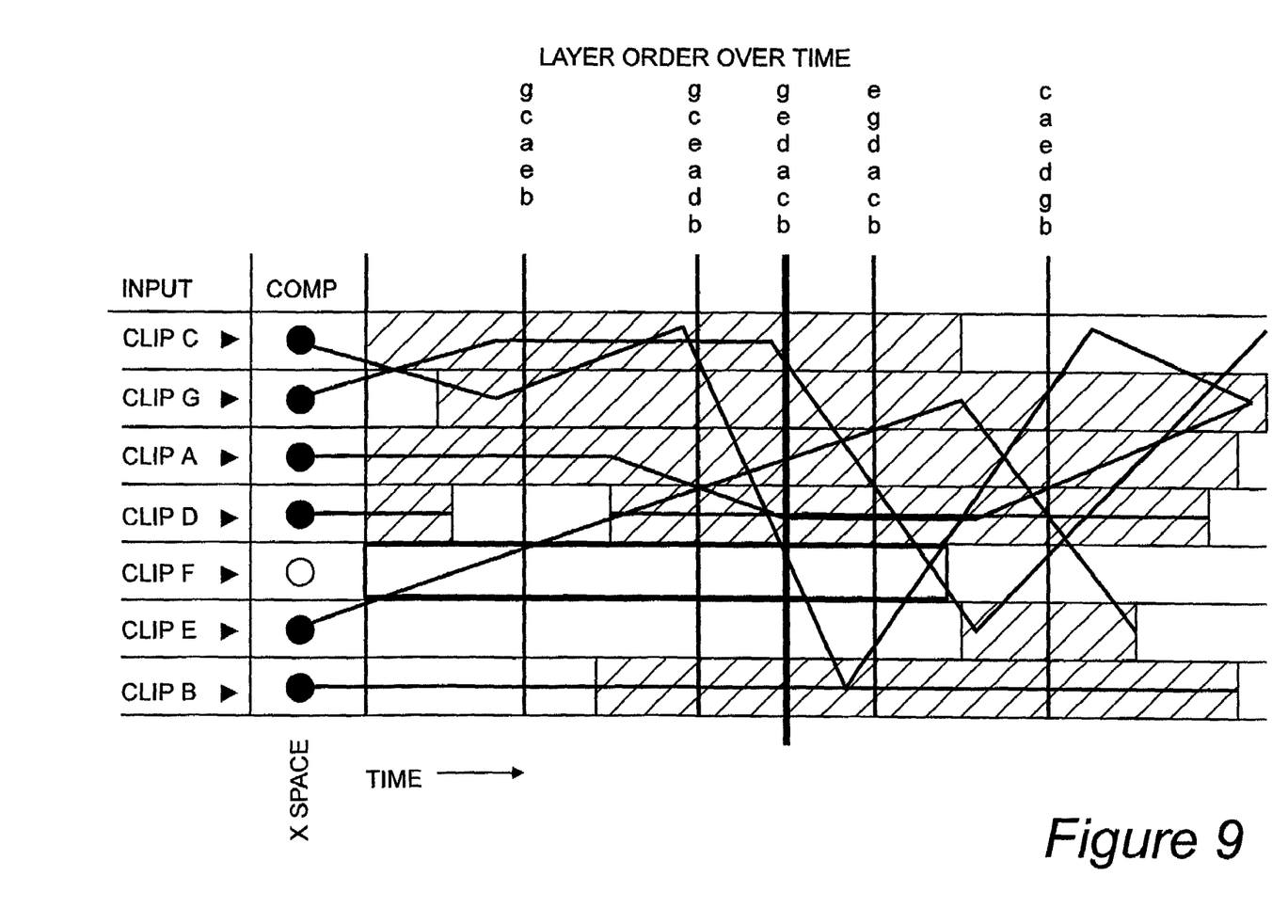
FIG. 9 illustrates a more detailed embodiment.

FIGS. 6, 7 and 8 show operations performed upon two input clips but the principle may be extended to a larger number of input clips. As shown in FIG. 9, a total of seven input clips are provided each having an associated control line that may be used to define layer orders over time.

FIG. 10

Figure 10:
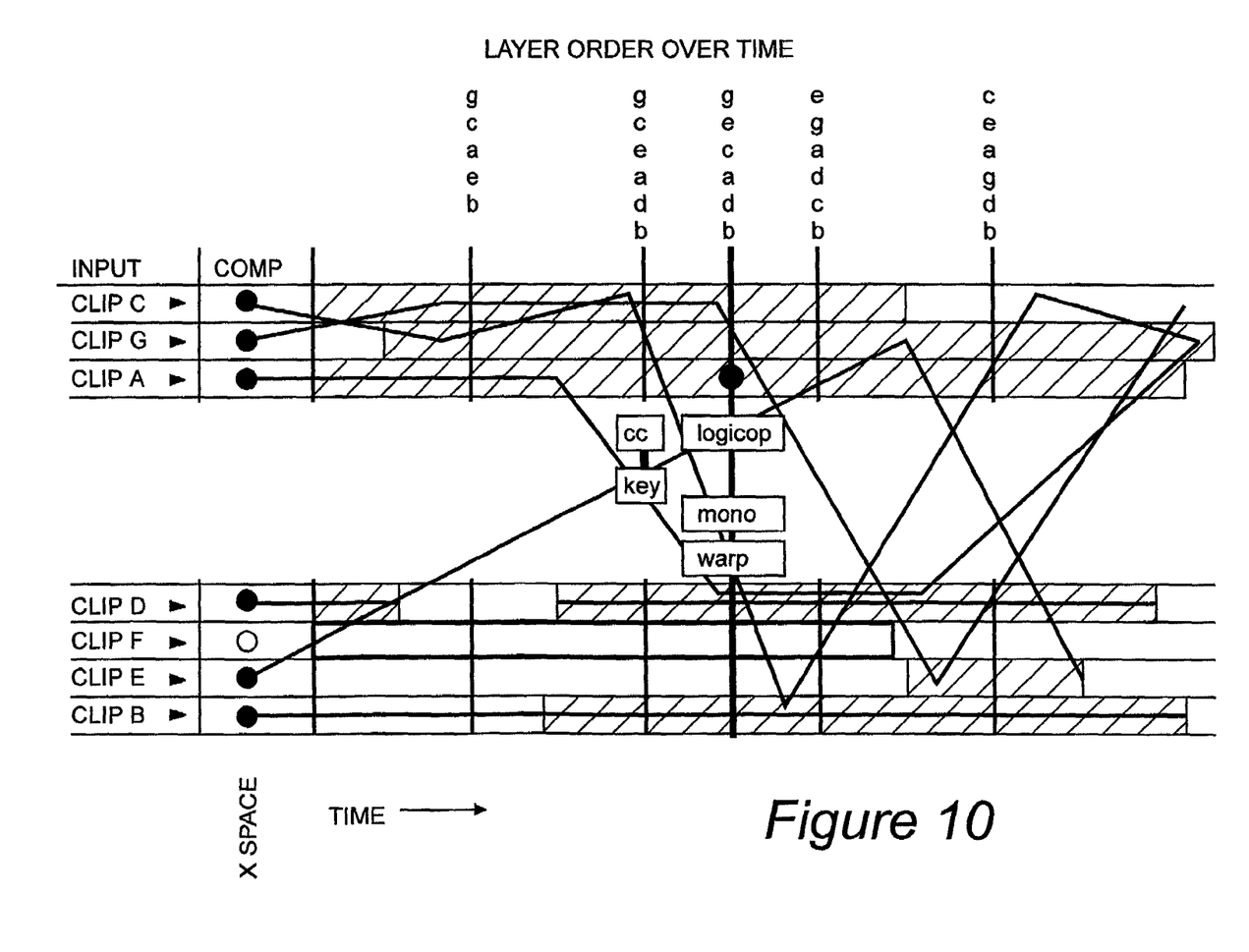
FIG. 10 shows a further enhanced embodiment.

In addition to defining layer orders or other effects that change gradually over time, using control lines as illustrated in FIG. 9, the principle may be extended as shown in FIG. 10 to include the incorporation of other effects, such as colour correction operations and warping operations etc in order to identify the nature of a particular effect, icons may be attached to control lines thereby identifying the nature of the effect that the control points are controlling.

What we claim is:

1. Image data processing apparatus, comprising frame storage means, processing means, manually operable input means and display means, wherein said display means is configured to display:
   (a) a first region representing a first timeline showing transitions between a first set of clips;
   (b) a second region representing a second timeline showing transitions between a second set of clips; and
   (c) a first control point overlaying said first time line and a second control point overlaying said second timeline, wherein
      (i) an output sequence is defined comprising a first portion of said first set of clips, and a second portion of said second set of clips, wherein said first portion and said second portion are based on said first control point and said second control point;
      (ii) an effect in said output sequence between said first portion off said first set of clips and said second portion of said second set of clips is controlled by a location of said first control point and said second control point on said first timeline and second timeline respectively;and
      (iii) said first control point and said second control point are connected by a displayed line.

2. Apparatus according to claim 1, wherein said effect relates to the priority layering of said first set of clips and said second set of clips.

3. Apparatus according to claim 1, wherein said effect relates to the location of clip images spatially within a whole image frame.

4. Apparatus according to claim 1, wherein said frame storage means includes a plurality of disk drives configured as a redundant array, wherein image frames are striped across a group of said disk drives.

5. Apparatus according to claim 1, wherein control points are located in response to manual operations performed upon a touch tablet.

6. Apparatus according to claim 1, wherein a third region represents a third time line and a third control point and a fourth control point are displayed.

7. Apparatus according to claim 1, wherein other effects are detailed by attachment of icons to said displayed line.

8. Apparatus according to claim 7, wherein said other effects include a warp or a colour collection.

9. Apparatus according to claim 1, wherein an output sequence is generated with reference to said control points.

10. A method of displaying control points on a timeline comprising:
    displaying a first region on a display device representing a first time line showing transitions between a first set of image clips;
    displaying a second region on said display device representing a second time line showing transitions between a second set of image clips; and
    displaying a first control point over said first time line and a second control point over said second time line;
    defining an output sequence comprising a first portion of said first set of image clips and a second portion of said second set of clips, wherein said first portion and said second portion an based on said first control point and said second control point;
    defining an effect in said output sequence between said first portion of said first set of clips and said second portion of said second set of clips, wherein the effect is controlled by a location of said first control point and said second control point on said first timeline and said second timeline respectively, and wherein said first control point and said second control point are connected by a displayed line.

11. A method according to claim 10, wherein said effect relates to the priority layering of said first set of clips and said second set of clips.

12. A method according to claim 10, wherein said effect relates to the location of clip images spatially within a whole image frame.

13. A method according to claim 10, wherein image frames are striped across a plurality of discs.

14. A method according to claim 10, wherein control points are located in response to manual operations performed upon a touch tablet.

15. A method according to claim 10, wherein a third region represents a third time line and a third control point and a fourth control point are displayed.

16. A method according to claim 10, wherein other effects are detailed by attachment of icons to said displayed line.

17. A method according to claim 16, wherein said other effects include a warp or colour correction.

18. A method according to claim 10, wherein an output sequence is generated with reference to said control points.

19. A computer readable medium having computer readable instructions executable by a computer to display control points on a timeline such that, when executing said instructions, a computer will perform the steps of:
    displaying a first region on a display device representing the first timeline showing transitions between a first set of image clips;
    displaying a second region on said display device representing a second timeline showing transitions between a second set of image clips; and
    displaying a first control point over said first timeline and a second control point over said second timeline;
    defining an output sequence comprising a first portion of said first set of image clips and a second portion of said second set of clips, wherein said first portion and said second portion are based on said first control point and said second control point;
    defining an effect in said output sequence between said first portion of said first set of clips and said second portion of said second set of clips, wherein said effect is controlled by a location of said first control point and said second control point on said first timeline and said second timeline respectively, and wherein said first control point and second control point are connected by a displayed line.

20. A computer readable medium having computer readable instructions according to claim 19 such that, when executing said instructions, a computer will also perform the step of relocating said control points in response to manual operations performed upon a touch tablet.

21. A computer readable medium having computer readable instructions according to claim 21 such that, when executing said instructions, a computer will also perform the step of representing a third time line and generating a third control point and a fourth control point.

22. A computer readable medium having computer readable instructions according to claim 19 such that, when executing said instructions, a computer will also perform the step of generating an output sequence with reference to said control points.

23. Image data processing apparatus configured to display control points on a timeline, comprising frame storage means, processing means, manually operable input means and display means, wherein said display means is configured to display:
    (a) a first region representing a first timeline showing transitions between a first set of clips;
    (b) a second region representing a second timeline showing transitions between a second set of dips; and
    (c) a first control point displayed over said first time line and a second control point displayed over said second timeline, wherein:
    (i) an output sequence is defined comprising a first portion of said first set of clips, and a second portion of said second set of clips, wherein said first portion and said second portion are based on said first control point and said second control point; and
    (ii) an effect in said output sequence between said first portion of said first set of clips and said second portion of said second set of clips is controlled by a location of said first control point and said second control point on said first timeline and second timeline respectively, and said control points are connected by a displayed line.

24. Apparatus according to claim 23 wherein said effect relates to the priority layering of said first set of clips and said second set of clips.

* * * * *

UNITED STATES PATENT AND TRADEMARK OFFICE
CERTIFICATE OF CORRECTION

PATENT NO. : 7,062,713 B2
APPLICATION NO. : 10/118835
DATED : June 13, 2006
INVENTOR(S) : Schriever et al.

It is certified that error appears in the above-identified patent and that said Letters Patent is hereby corrected as shown below:

Column 6:

Claim 1, line 47, delete "off" and insert --of--.

Column 8:

Claim 23, line 42, delete "dips" and insert --clips--.

Signed and Sealed this

Twenty-sixth Day of October, 2010

David J. Kappos
*Director of the United States Patent and Trademark Office*